(12) United States Patent
Abensur

(10) Patent No.: US 11,639,239 B2
(45) Date of Patent: May 2, 2023

(54) ELECTROMECHANICAL POINT SEPARATION SYSTEM

(71) Applicant: ARIANEGROUP SAS, Paris (FR)

(72) Inventor: Thierry Abensur, Poissy (FR)

(73) Assignee: ARIANEGROUP SAS, Paris (FR)

(*) Notice: Subject to any disclaimer, the term of this patent is extended or adjusted under 35 U.S.C. 154(b) by 972 days.

(21) Appl. No.: 16/426,329

(22) Filed: May 30, 2019

(65) Prior Publication Data
US 2019/0367193 A1    Dec. 5, 2019

(30) Foreign Application Priority Data

May 31, 2018 (FR) ...................................... 1800534

(51) Int. Cl.
    *B64G 1/64* (2006.01)
(52) U.S. Cl.
    CPC ............. *B64G 1/645* (2013.01); *B64G 1/641* (2013.01)
(58) Field of Classification Search
    CPC .......... B64G 1/64; B64G 1/641; B64G 1/645; F42B 15/36
    See application file for complete search history.

(56) References Cited

U.S. PATENT DOCUMENTS

| 4,187,759 A | 2/1980 | Toy et al. |
| 4,929,135 A * | 5/1990 | Delarue ................. B64G 1/645 102/378 |
| 5,221,171 A | 6/1993 | Rudoy et al. |
| 5,695,306 A * | 12/1997 | Nygren, Jr. ........... F15B 15/261 411/433 |
| 6,052,992 A | 4/2000 | Eroshenko |
| 6,352,397 B1 * | 3/2002 | O'Quinn ................ B64G 1/645 411/270 |
| 6,629,486 B2 * | 10/2003 | Forys ...................... F15B 15/19 89/1.14 |

(Continued)

FOREIGN PATENT DOCUMENTS

| CN | 114750985 A * | 7/2022 |
| EP | 0 791 139 B1 | 3/2000 |
| EP | 1 250 539 B1 | 1/2004 |

OTHER PUBLICATIONS

Preliminary Search Report dated Feb. 14, 2019, for French Application No. 1800534, filed May 31, 2018, 2 pages.

*Primary Examiner* — Magdalena Topolski
(74) *Attorney, Agent, or Firm* — Christensen O'Connor Johnson Kindness PLLC

(57) ABSTRACT

The system (S) to separate at least two mechanical elements (E1, E2), comprises a holding device comprising a connecting screw integral with a mechanical element (E1) and held by a nut segmented in portions (4n) arranged between the connecting screw and an outer envelope integral with the other mechanical element (E2), the system (S) comprising a force generator generating a thrust force (F) in a longitudinal direction (X-X) and comprising an energy accumulator comprising a sealed chamber with a colloid of a porous matrix and liquid, the chamber deforming in the longitudinal direction (X-X) to adapt to the change from a compressed to a decompressed state in order to generate the force (F), and an activatable actuating element to, either apply a predetermined pressure to the chamber to keep the colloid in the compressed state, or not apply the predetermined pressure to allow the change in state of the colloid.

9 Claims, 4 Drawing Sheets

(56) References Cited

U.S. PATENT DOCUMENTS

| | | | |
|---|---|---|---|
| 6,760,211 B2* | 7/2004 | Bueno Ruiz | F16B 37/0864 |
| | | | 361/194 |
| 6,769,830 B1* | 8/2004 | Nygren | F16B 41/002 |
| | | | 29/446 |
| 6,920,966 B2* | 7/2005 | Buchele | B64G 1/645 |
| | | | 188/300 |
| 7,001,127 B2* | 2/2006 | Tuszynski | B64G 1/645 |
| | | | 411/433 |
| 7,261,038 B2* | 8/2007 | Cleveland | F42B 15/38 |
| | | | 102/378 |
| 2003/0010587 A1 | 1/2003 | Eroshenko | |
| 2003/0076215 A1* | 4/2003 | Baghdasarian | B64G 1/222 |
| | | | 337/140 |
| 2013/0101369 A1* | 4/2013 | Lenoir | F16B 31/00 |
| | | | 411/2 |
| 2020/0189771 A1* | 6/2020 | Remmelg | B64G 1/645 |

* cited by examiner

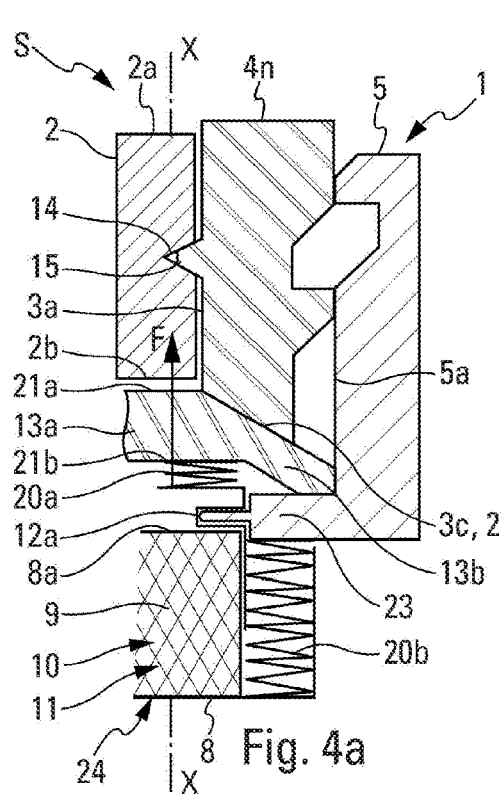
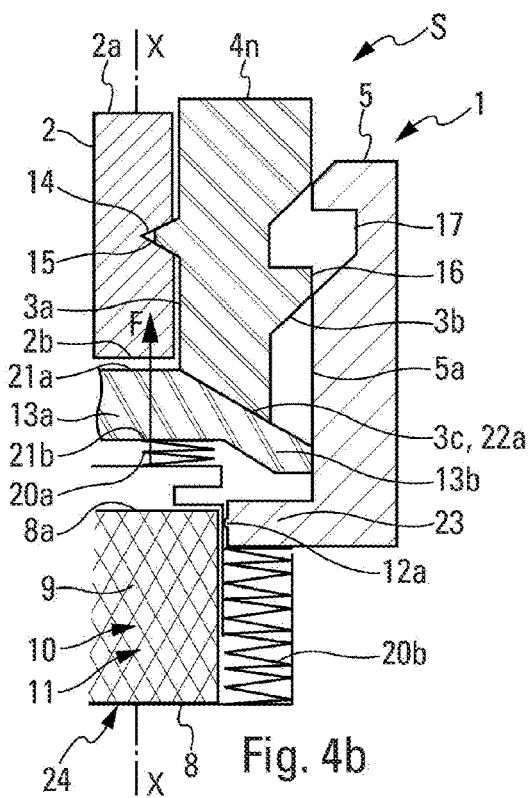
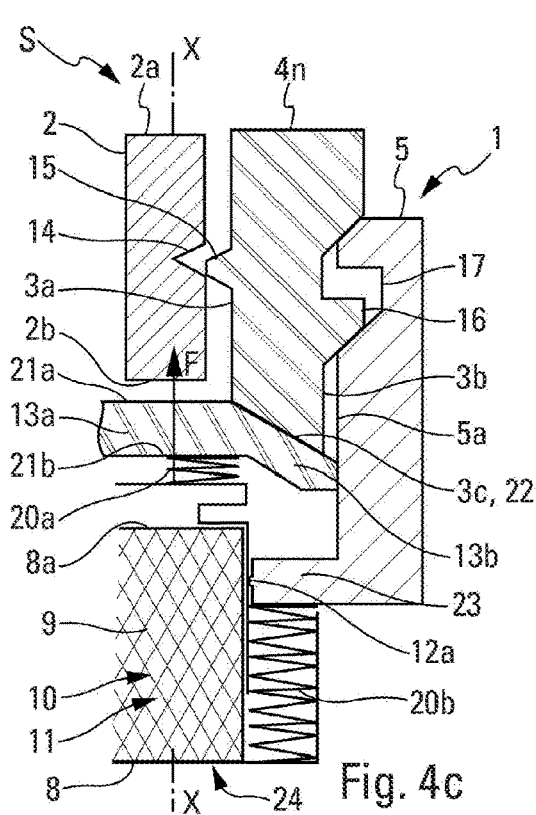
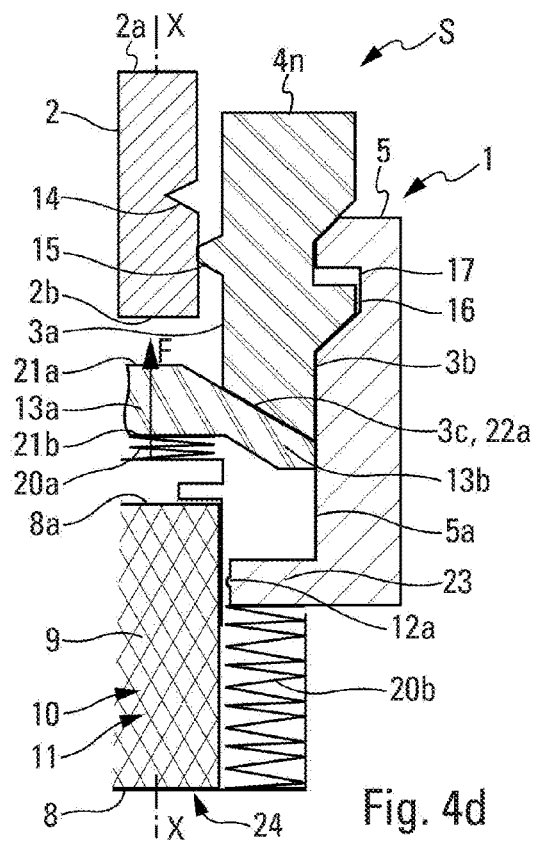

ELECTROMECHANICAL POINT SEPARATION SYSTEM

TECHNICAL FIELD

The present invention relates to an electromechanical point separation system.

BACKGROUND

More particularly, although not exclusively, the present invention can be applied to a (space) launcher, comprising in particular a plurality of successive droppable propulsion stages and a payload which can be arranged under a cap. The payload can be, for example, an artificial satellite or a space probe. The take-off of the launcher is achieved by the ignition of the propulsion stages in a successive manner. Once a stage is no longer providing propulsion to the launcher due to a lack of fuel, it separates from the launcher, then is dropped so as to no longer interfere with the trajectory of the launcher during its flight phase. The next propulsion stage takes over until the launcher reaches the necessary altitude for deploying the payload in orbit around the Earth or in interplanetary space. At the appropriate time, the cap then the payload are separated from the launcher. Due to the constraints of aerospace, each separation of a component of the launcher must be extremely quick.

There are many types of system for separating two elements, which can be distinguished by their manner of generating a force which is sufficient to separate the two elements.

Thus, pyrotechnic separation systems, which are based on the combustion of a pyrotechnic load, are often used in the aviation and aerospace sectors because said systems are compact, light, and generate a significant force very quickly. However, the assembly of pyrotechnic separation systems leads to significant safety constraints due to the risks of the pyrotechnic load being triggered inadvertently. These safety constraints generate significant assembly costs.

It is also possible to use non-pyrotechnic separation systems, which can be of the electrothermal, electromechanical or electropneumatic type. By way of example, a device for separation between a connecting screw and a segmented nut is known from an article titled "Design and Experimental Validation of Compact, Quick-Response Shape Memory Alloy Separation Device", published in "Journal of Mechanical Design", vol. 136, in January 2014.

Safety constraints during the assembly of this type of non-pyrotechnic system are lower. However, these systems are generally heavier and bulkier than pyrotechnic separation systems and involve much longer separation times (of approximately a few hundred milliseconds to several seconds).

SUMMARY

The object of the present invention is to remedy these drawbacks. The invention relates to a system for electromechanical point separation of at least two separable mechanical elements.

According to the invention, the electromechanical point separation system comprises a holding device comprising a connecting screw integral with a first of said separable mechanical elements, the connecting screw being held by a segmented nut comprising a plurality of portions arranged between the connecting screw and an outer envelope, said outer envelope being integral with the second of said separable mechanical elements, said system also comprising an activatable force generator capable of generating a thrust force in the longitudinal direction, making it possible, in link with cooperating shapes between each of said portions and the outer envelope, to cause a displacement of each of said portions of the segmented nut in a so-called radial direction, perpendicular to the longitudinal direction, from the connecting screw towards the outer envelope to release the connecting screw from the segmented nut in order to separate the two separable mechanical elements.

In addition, according to the invention, the force generator comprises: a mechanical energy accumulator capable of generating the thrust force, said accumulator comprising at least one sealed chamber provided with a colloid, said colloid being formed of a porous matrix and of a liquid, the chamber being capable of deforming itself in a so-called longitudinal direction to adapt itself to the change from a compressed state to a decompressed state of the colloid, a state of the colloid depending of a mechanical pressure applied to the chamber, the deformation in the longitudinal direction of the chamber generating the thrust force; and an activatable actuating element, arranged on the chamber and designed to:

either apply a predetermined mechanical pressure to the chamber in order to keep the colloid in the compressed state, or, during its activation, not apply the predetermined mechanical pressure to the chamber in order to enable the change from the compressed state to the decompressed state of the colloid.

Thus, thanks to the invention, the change from a compressed state to a decompressed state of the colloid and the resulting deformation of the chamber allow the force generator to generate a high force over very short periods of time. In addition, the elements which form the force generator, such as the chamber, the colloid and the activatable actuating element, are not bulky, and this makes the force generator compact and light. The electromechanical point separation system thus makes it possible to remedy at least some of the above-mentioned drawbacks.

Furthermore, as the power source of the force generator is based on a reversible change in the state of the colloid contained in the deformable chamber, the proper functioning of the force system can be tested before its use.

Advantageously, the force generator is designed to bring the colloid into one or the other of the following states:

the compressed state when the chamber is subjected to a mechanical pressure value which is greater than or equal to a first predetermined pressure threshold, the intrusion of at least some of the liquid into the pores of the porous matrix generating the compressed state of the colloid;

the decompressed state when the chamber is subjected to a pressure value which is less than or equal to a second predetermined pressure threshold, the extrusion of at least some of the liquid of the pores of the porous matrix generating the decompressed state of the colloid, the first predetermined pressure threshold being greater than the second predetermined pressure threshold.

In the context of the present invention, the chamber can be produced in different manners.

In a first embodiment, the deformable and sealed chamber comprises a bellows made of one of the following materials: metal, elastomer.

In a second embodiment, the deformable and sealed chamber is a chamber of an actuator.

Furthermore, in the context of the present invention, any colloid featuring the above-mentioned characteristics can be used.

Preferentially, the porous matrix of the colloid consists of one of the following materials: a powder consisting of grains, a gel consisting of beads.

Furthermore, advantageously, the surface of the porous matrix can be covered with a lyophobic chemical layer.

In addition, the liquid corresponds to one of the following components: water, an alloy of gallium, indium and tin.

Furthermore, in a specific embodiment, the colloid is contained in a plurality of individual envelopes immersed in a fluid contained in the chamber.

By way of example, this type of device, called lyophobic heterogeneous system, is described in the two following European patents: EP 0 791 139 and EP 1 250 539.

Advantageously, the holding device also comprises a support element arranged between firstly the force generator and secondly the connecting screw and the plurality of portions of the segmented nut, said support element being designed to receive the thrust force generated by the force generator and transmit it to the connecting screw and to the plurality of portions producing both the displacement of the connecting screw in the longitudinal direction and the displacement in the radial direction of each of said portions.

Preferably, each of said portions of the segmented nut is provided with a radially inner face, whose shape is designed to cooperate with the connecting screw, and provided with a radially outer face, whose shape is designed to cooperate with the outer envelope in order to take part in the transmission of the thrust force then in the release of the connecting screw.

Advantageously, the holding device comprises:

the support element of a conical shape, provided with a planar central portion and with an annular portion;

the connecting screw of a circular cross section, arranged on the planar portion of the support element by a first face and integral with the first separable mechanical element by a second face, said second face being opposite the first face;

the outer envelope of a circular cross section greater than the circular cross section of the connecting screw, the outer envelope being provided with a bent end in which is arranged the end of the annular portion of the support element; and the segmented nut formed of the plurality of portions arranged between the connecting screw and the outer envelope, which relies on the annular portion of the support element, the segmented nut being capable of moving in the radial direction along the annular portion of the support element from a first bearing position against the connecting screw towards a second position in which the connecting screw is released.

Furthermore, the holding device also comprises at least two springs, one of the at least two springs being arranged between the chamber and the planar central portion of the support element, and the other of the at least two springs being arranged against the lower portion of the outer envelope.

The present invention also relates to a device for the electromechanical separation of at least two separable mechanical elements, comprising a plurality of electromechanical point separation systems such as one specified above.

In addition, the present invention relates to a launcher comprising an electromechanical separation device and/or to an electromechanical point separation system such as those specified above.

DESCRIPTION OF THE DRAWINGS

The appended drawings will show how the invention can be carried out. In these drawings, same reference numerals denote like elements. More particularly:

FIGS. 4a to 4d are partial schematic, longitudinal sectional views of the electromechanical point separation system according to the first embodiment, in different successive states during the separation respectively.

DETAILED DESCRIPTION

Figure 1:
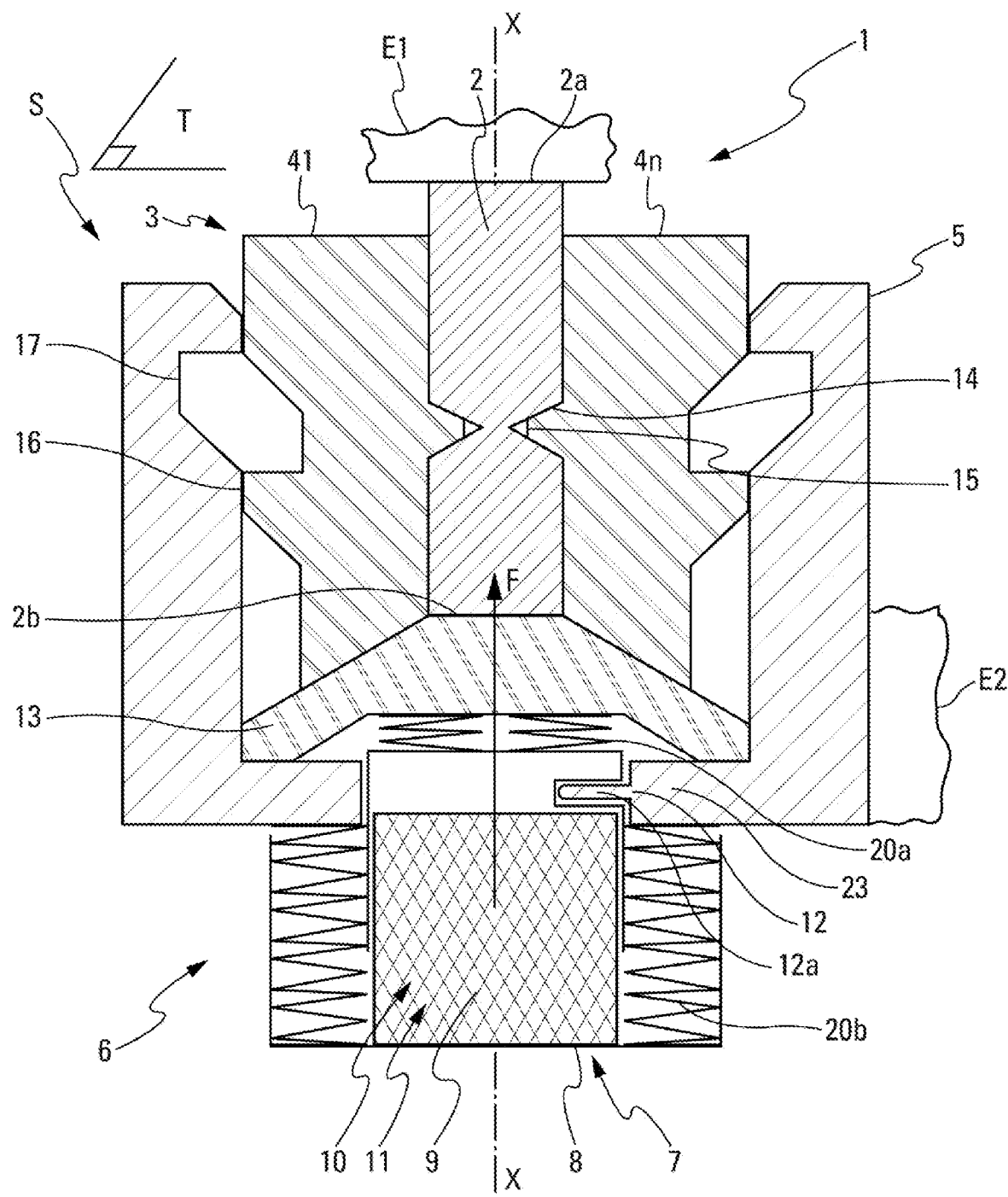
FIG. 1 is a schematic, longitudinal sectional view of an electromechanical point separation system according to a first embodiment.

The electromechanical point separation system S (hereinafter referred to as "system S"), whose one embodiment is shown schematically in FIG. 1, is intended to separate at least two separable mechanical elements E1 and E2 (represented partially and very schematically in FIG. 1). The term "point" refers to the location of the system S in a specific region between the separable elements.

The system S comprises a holding device 1 and a force generator 6. The holding device 1 is designed to, on the one hand, hold the two separable mechanical elements E1 and E2 before their separation and, on the other hand, allow their separation by a thrust force generated by the force generator 6.

The holding device 1 comprises a connecting screw 2, of an elongated shape according to a direction so-called longitudinal, which is integral with a first separable mechanical element E1. The connecting screw 2 is held by a nut 3 arranged around said screw. This nut 3, so-called segmented, is comprised of a plurality of individual portions 4n arranged between the connecting screw 2 and an outer envelope 5. This outer envelope 5 is integral with the second separable mechanical element E2.

The force generator 6 is activatable and is capable of generating the thrust force in the longitudinal direction, making it possible, in link with shapes cooperating between each of the portions 4n and the outer envelope 5, as specified below, to produce a displacement of each of the portions 4n of the segmented nut 3 in a direction which is so-called radial, perpendicular to the longitudinal direction, from the connecting screw 2 towards the outer envelope 5. The function of this displacement in the radial direction is to release the connecting screw 2 from the segmented nut 3 in order to separate the two separable mechanical elements E1 and E2.

For this purpose, the force generator 6 comprises, as represented in FIG. 1:

a mechanical energy accumulator 7 which is capable of generating the thrust force. The accumulator 7 comprises at least one sealed chamber 8 provided with a colloid 9. Said colloid 9 is formed of a porous matrix 10 and of a liquid 11. In addition, the colloid 9 features characteristics which allow it to change state, from a compressed state to a decompressed state and vice versa. The chamber 8 is capable of deforming itself in the longitudinal direction to adapt itself to a change of the colloid 9 from the compressed state to the decompressed state. The state of the colloid 9 depends on a mechanical pressure applied to the chamber 8. The deformation of the chamber 8 in the longitudinal direction generates the thrust force of the force generator 6; and an activatable actuating element 12, arranged on the chamber 8 and designed to:

either apply a predetermined mechanical pressure to the chamber 8 to keep the colloid 9 in the compressed state, or, during its activation, not apply the predetermined mechanical pressure to the chamber 8 in order to make it possible to change from the compressed state to the decompressed state of the colloid 9.

In the rest of the description, a coordinate system associated with the system S is used. This coordinate system is defined according to an axis so-called longitudinal X-X which corresponds to the longitudinal direction arrangement of the connecting screw 2 (for example the axis of symmetry of the latter) and a transverse plane T perpendicular to the longitudinal axis X-X and comprising the radial direction. The adjective "greater" is defined in the direction (represented by an arrow F in FIG. 1 in particular) of generation of the thrust force in the longitudinal direction. The adjective "less" is defined in the opposite direction to the direction represented by the arrow F, in the longitudinal direction. As for the radial direction, it is defined radially in a section transverse to the longitudinal axis X-X (corresponding to the transverse plane T), from the centre representing the position of the longitudinal axis X-X in the transverse plane T. The adjectives "inner" and "outer" are defined in relation to the radial direction, towards the longitudinal axis X-X and in the opposite direction respectively.

As represented in FIG. 1, the connecting screw 2 is of a circular cross section and is arranged along the longitudinal axis X-X. A first face, so-called upper face 2a of the connecting screw 2 is integral with one of the separable mechanical elements E1. The connecting screw 2 can comprise an annular notch 14 on its peripheral surface, so-called radial surface. The connecting screw 2 rests, via a second face so-called lower face 2b, longitudinally opposite the upper face 2a, on a support element 13.

Figures 2A, 2B:
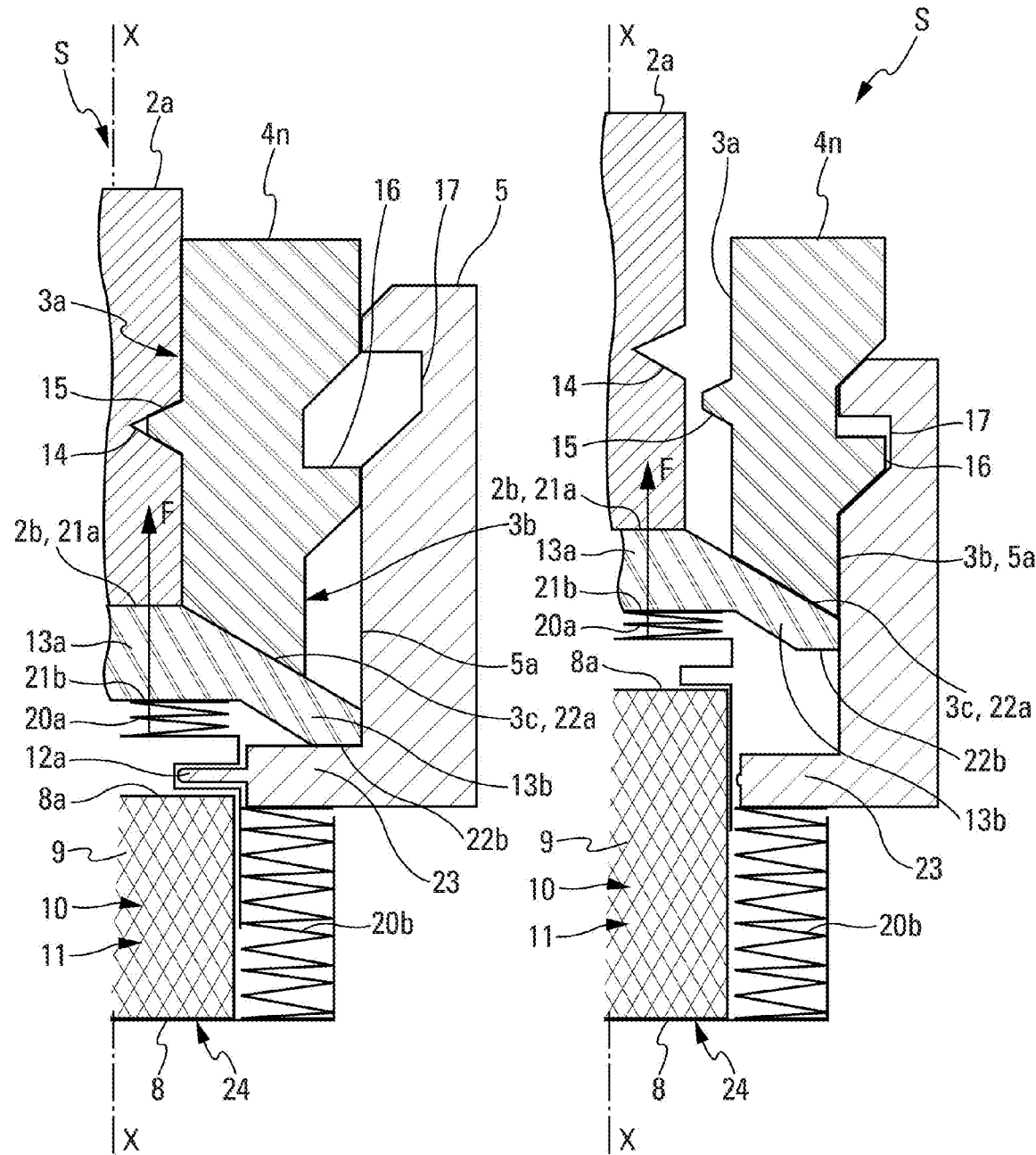
FIGS. 2a and 2b are partial schematic, longitudinal sectional views of the electromechanical point separation system according to the first embodiment, for two different states of the colloid respectively.

As represented in FIGS. 2a, 2b, 3a, 3b, 4a, 4b, 4c and 4d, the support element 13 is of a conical shape and comprises a planar central portion 13a and an annular portion 13b, arranged radially outwardly in relation to the planar central portion 13a. The planar central portion 13a and the annular portion 13b each comprise an upper face 21a, 22a and a lower face 21b, 22b (FIGS. 2a and 2b). The lower face 2b of the connecting screw 2 rests on the upper face 21a of the planar central portion 13a of the support element 13 of identical surface. The support element 13 is arranged in the transverse plane T perpendicular to the longitudinal axis X-X.

The holding device 1 also comprises the segmented nut 3 arranged around the connecting screw 2 and formed of the plurality of portions 4n (n=1, . . . , N, with N a positive integer). Each of the portions 4n has an elongated shape according to the longitudinal axis X-X and represents an arc of a circle in the transverse plane T between the connecting screw 2 and the outer envelope 5. Each of the portions 4n is capable of moving in the radial direction under the impulse of a thrust force generated by the force generator 6, as specified hereinafter.

As represented in FIGS. 2a, 2b, 3a, 3b, 4a, 4b, 4c and 4d, each of the portions 4n comprises a lower face 3c which rests on the upper face 22a of the annular portion 13b of the support element 13. In addition, each of the portions 4n is provided with a face, so-called radially inner face 3a, facing the connecting screw 2 and a face, so-called radially outer face 3b, opposite the radially inner face 3a. In a specific embodiment, the radially inner face 3a of each of the portions 4n of the nut 3 comprises a lug 15 which is capable of cooperating with a portion of the annular notch 14 made on the radial surface of the connecting screw 2. The radially outer face 3b of each of the portions 4n of the nut 3 has a tooth 16. The radially outer face 3b of each of the portions 4n is arranged facing a face, so-called radially inner face 5a, of the outer envelope 5.

The outer envelope 5 is a cylindrical part arranged around the connecting screw 2 and the segmented nut 3. The outer envelope 5 is integral with the separable mechanical element E2. Furthermore, the outer envelope 5 comprises a portion so-called longitudinal arranged according to the longitudinal axis X-X, whose radially inner face 5a is provided with a groove 17 capable of cooperating with the tooth 16 of each of the portions 4n. The outer envelope 5 also comprises a base 23 arranged in the transverse plane T and connected to the longitudinal portion (with which said base forms a bend). This bend is designed to prevent any movement of the support element 13 in an opposite direction to the direction of the thrust force, represented by the arrow F (FIGS. 1, 2a and 2b).

As set out above, the force generator 6 comprises the mechanical energy accumulator 7 and the activatable actuating element 12. The mechanical energy accumulator 7 comprises the sealed chamber 8. The chamber 8 is provided with rigid faces with the exception of an upper face 8a designed to allow the deformation of the chamber 8 in the longitudinal direction according to the direction of the arrow F.

The chamber 8 is provided with the colloid 9. The colloid is a lyophobic heterogeneous structure which represents an energy accumulation structure. The colloid 9 is designed to pass from the compressed state to the decompressed state and vice versa, according to the mechanical pressure which is applied to the chamber 8. The colloid 9 is formed of a porous matrix 10 and of a liquid 11. The liquid 11 features a wetting angle of greater than 90 degrees with respect to the porous matrix 10. The liquid 11 can be of different types.

In a specific embodiment, the liquid 11 can be water. In another embodiment, the liquid 11 is an alloy of gallium, indium and tin.

Preferably, the porous matrix 10 consists of a material of the silicate type. The porous matrix 10 is a powder comprising grains, whose diameter can be several micrometres. The space between the grains forms a set of nanometre-sized pores. For example, the powder constituting the porous matrix 10 is a zeolite. In a variant, the porous matrix 10 is a gel comprising beads, whose diameter is also several micrometres. By way of example, the gel constituting the porous matrix 10 can be a silica gel.

In a preferred embodiment represented in FIGS. 2a to 4d, the porous matrix 10 is formed of a material which is lyophobic with respect to the liquid 11.

In a variant, the lyophobic property of the porous matrix 10 is obtained after a chemical treatment of the grafting type of the material which forms said matrix. More particularly, the surface of the porous matrix 10 is covered with a lyophobic chemical layer. The surface of the porous matrix 10 includes the outer surface and the inner surface corresponding to the surface of the pores.

In a preferred embodiment (represented in the drawings), the colloid 9, formed of the porous matrix 10 and of the liquid 11, is directly contained in the chamber 8.

In another non-represented embodiment, the colloid 9 is contained in a plurality of individual envelopes. The plurality of individual envelopes is immersed in a fluid contained in the chamber 8. By way of example, this fluid can be oil.

Furthermore, the actuating element 12 of the force generator 6 is designed to apply a predetermined mechanical pressure on the colloid 9 by means of the chamber 8 in order to keep said colloid in the compressed state.

In a first embodiment, illustrated in FIGS. 2a and 2b, the chamber 8 is a bellows 24 made of metal. The bellows 24 can also be made of elastomer. In addition, the activatable actuating element 12 is an electromechanical finger 12a secured, by one of its ends, to the base 23 of the outer envelope 5 and engaged in a reinforcement of an upper portion of the chamber 8, in order to prevent the extension of the bellows 24. During its activation (carried out in a usual way) by a command (of the electrical type) automatically generated by a control unit (not represented), the electromechanical finger 12a moves in the radial direction so as to no longer apply mechanical pressure to the colloid 9 by means of the chamber 8.

In a variant, the activation of the actuating element 12 can generate a rotational movement of the latter instead of a displacement in the radial direction. In another variant, the actuating element 12 is a ball. The activation of the actuating element 12 causes its release from a housing provided on the chamber 8.

Figures 3A, 3B:
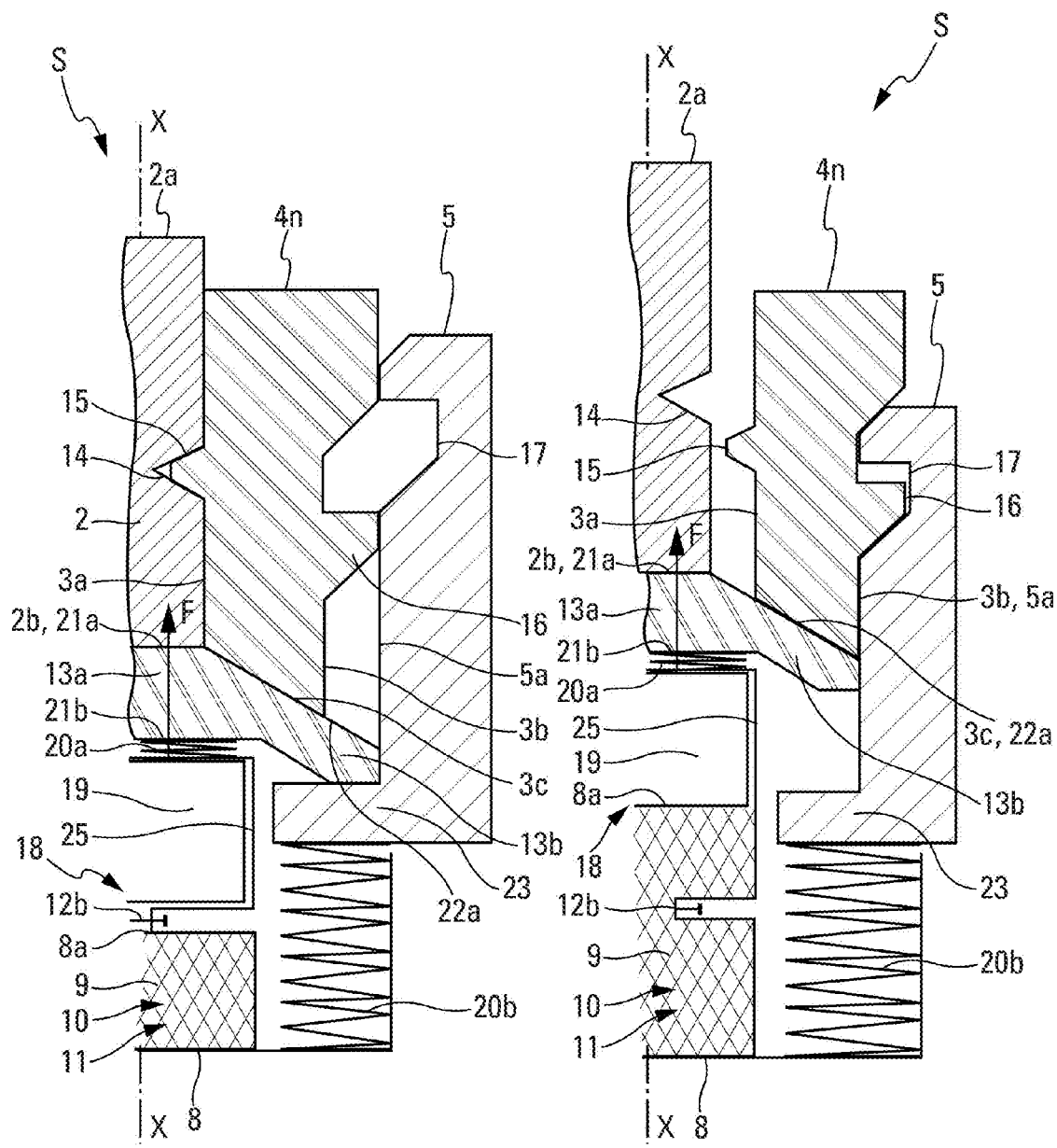
FIGS. 3a and 3b are partial schematic, longitudinal sectional views of the electromechanical point separation system according to a second embodiment, for two different states of the colloid respectively.

In a second embodiment, illustrated in FIGS. 3a and 3b, the force generator 6 comprises an actuator 18. The actuator 18 comprises, in a lower portion, the chamber 8 and, in an upper portion, a piston 19 which is capable of moving in the longitudinal direction. The actuator also comprises a seal 25 arranged outside of the actuator 18 in the radial direction in order to ensure the sealing of chamber 8. In this second embodiment, the activatable actuating element 12 corresponds to an electromechanical valve 12b arranged in a reinforcement provided in the chamber 8 of the actuator 18. The electromechanical valve 12b is designed to apply a predetermined mechanical pressure to the colloid 9 by means of the chamber 8 in order to keep it in the compressed state. When it is activated, the electromechanical valve 12b opens so as to no longer apply said predetermined mechanical pressure, thus allowing the colloid 9 to pass into the decompressed state in the chamber 8 of the actuator 18.

Furthermore, the system S is provided with a plurality of springs 20a, 20b. A spring 20a is arranged between the upper face 8a of the chamber 8 or of the piston 19 and the lower face 21b of the planar central portion 13a of the support element 13. Another spring 20b can be arranged against the base 23 of the outer envelope 5. The springs 20a and 20b are arranged so as to maintain a relative stability of the different elements of the system S before the separation of the mechanical elements. The springs 20a and 20b also have the function of attenuating the vibrations to which the holding device 1 and the force generator 6 can be subjected before activation.

Thus, the system S comprises the mechanical energy accumulator 7 (or molecular spring) capable of accumulating very high energy and power densities. The accumulator 7 is also called molecular spring. The system S thus features the advantage of being capable of transmitting high levels of forces whilst remaining light and not bulky. In addition, the system S makes it possible to separate the separable mechanical elements E1 and E2 in very short periods of time. Indeed, the separation time of these elements by the system S is of the order of a few tens of milliseconds.

The operating mode of the point separation system S, as described above, is presented hereinafter with reference to FIGS. 4a to 4d which illustrate the first embodiment. The operating mode of the system S in the second embodiment is identical.

During the setup of the force generator 6, before its use, the colloid 9 is put into a compressed state by applying to the chamber 8 a predetermined mechanical pressure which must be greater than or equal to an intrusion pressure. This intrusion pressure is a function depending on the surface tension of the liquid 11 at the temperature in which is the system, on the wetting angle of the liquid 11 and on the conformation of the pores of the porous matrix 10. It is therefore determined by the choice of the liquid 11 and the choice of the material of the porous matrix 10. The intrusion pressure can be equal to about 1110 bars if the liquid 11 of the colloid 9 is water.

The application of a predetermined mechanical pressure greater than or equal to the intrusion pressure on the chamber 8 causes the intrusion of at least some of the liquid 11 into the pores of the porous matrix 10. During this intrusion, the surface of separation between the liquid 11 and the solid porous matrix 10 increases and with it the energy accumulated in the colloid 9. By way of example, the colloid 9, in a compressed state, can accumulate between 5 and 500 joules per cubic centimetre.

As represented in FIG. 4a, the actuating element designed in the form of a finger 12a in this example is put into place in order to keep the colloid 9 in the compressed state by applying on the chamber 8 the predetermined mechanical pressure.

Before the system S is used, the connecting screw 2 is integral with the segmented nut 3 by means of the lugs 15 arranged on the inner face 3a of each of the portions 4n. These lugs 15 are placed in the annular notch 14 made in the connecting screw 2. Each of the portions 4n is also held in a stable position by means of the tooth 16 provided on the radially outer face 3b of each of the portions 4n. Each tooth 16 is arranged bearing against the radially inner face 5a of the outer envelope 5. In addition, the spring 20a arranged between the support element 13 and the chamber 8, and the spring 20b arranged against the base 23 of the outer envelope 5 contribute to the stability of the system S by absorbing in particular the vibrational movements that the system S can be subjected to before its use.

During the automatic activation of the force generator by a usual (electrical) activation signal, the actuating element 12 disengages from the recess of the chamber 8. The predetermined mechanical pressure is no longer applied to the colloid 9 by means of the chamber 8. Some of the liquid 11 located in the pores of the porous matrix 10 is released by capillary action, out of these pores, by exerting an extrusion pressure. By way of example, the extrusion pressure may be 1000 bars if the liquid 11 of the colloid 9 is water. It can represent more than 90% of the intrusion pressure. When the size of the pores is very small, there is very little hysteresis. The intrusion pressure and the extrusion pressure feature very similar values. The extrusion of the liquid 11 changes the state of the colloid 9 from the compressed state to the decompressed state by releasing the accumulated energy. The volume of the colloid 9 in the decompressed state increases and causes the deformation of the chamber 8 in the longitudinal direction.

As represented in FIGS. 4b, 4c and 4d, the extrusion pressure deforms the chamber 9 in the longitudinal direction and thus generates a thrust force which is transmitted to the holding device 1. The thrust force produces a displacement in the direction of the arrow F of the support element 13 and of the connecting screw 2 and of each of the portions 4n of the nut 3 which rest on said support element 13. The portions 4n move relative to the outer envelope 5 (FIG. 4b).

When the tooth 16 of the radially outer face 3b of each of the portions 4n faces the groove 17 in the outer envelope 5, the displacement in the longitudinal direction of each of the portions 4n is converted into a displacement in the radial direction. The displacement in the radial direction of each of the portions 4n corresponds to their sliding on the upper face 22a of the annular portion 13b of the support element 13 from a first position of bearing against the connecting screw 2 towards the outer envelope 5. The displacement in the radial direction is also facilitated by the cooperation of the shape of the tooth 16 with the shape of the groove 17. This shape-cooperation allows the tooth 16 to slide into the groove 17. The displacement in the radial direction of each of the portions 4n, which thus move away from the connecting screw 2, causes a release of the lug 15 of the radially inner face 3a from the notch 14 of the connecting screw 2. The connecting screw 2 is then released from the nut 3 (FIG. 4c). In addition, the force generator 6 supplies, via the displacement of the support element 13, an impulse to the connecting screw 2. This impulse allows the connecting screw 2 to continue to move after its release, in the direction illustrated by the arrow F, in order to allow the complete separation of the mechanical elements E1 and E2.

As represented in FIG. 4d, the displacement in the radial direction of each of the portions 4n continues until the tooth 16 of the radially outer face 3b of each of the portions 4n is engaged in the groove 17 in the outer envelope 5. This engagement makes it possible to block any movement of each of the portions 4n in the longitudinal and radial directions. The connecting screw 2 continues to move with a speed which is proportional to the extrusion pressure supplied by the colloid 9 during its passage from the compressed state to the decompressed state.

The electromechanical point separation system S, as described above, can be part of an electromechanical separation device. This electromechanical separation device comprises a plurality of M systems S which are arranged in different locations between the two separable mechanical elements E1, E2, in order to optimise the separation of these two mechanical elements E1 and E2. By way of example, the number M can be comprised between 2 and 12.

Furthermore, this separation device and/or the system S can be used in many different applications.

In a non-limiting manner, the separation device and/or the system S can be used to contribute to the separation and to the dropping of bombs or of any other object from an aircraft, for example by means of a hatch. The separation device and/or the system S can also be used for the separation and the dropping of objects by a missile.

Furthermore, the separation device and/or the system S can be used in the context of a separation and a deployment of various elements, such as a solar panel, a radiator or an antenna, on a satellite or a space probe.

In one particular application, the separation device and/or the system S are integrated in a (space) launcher comprising, in particular, a plurality of successive droppable propulsion stages and a payload (artificial satellite or space probe) which can be arranged under a cap, the propulsion of the launcher being ensured by the successive stages. The separation device and/or the system S can be used to allow the separation and the dropping of one or more propulsion stages when the latter are no longer providing propulsion to the launcher. Furthermore, such a separation device (and/or system S) can be arranged in the level of the cap to allow the cap and the payload of the launcher to be dropped.

While illustrative embodiments have been illustrated and described, it will be appreciated that various changes can be made therein without departing from the spirit and scope of the invention.

The embodiments of the invention in which an exclusive property of privildege is claimed are defined as follows:

1. A system for electromechanical point separation of at least two separable mechanical elements, said system comprising a holding device comprising a connecting screw integral with a first of said separable mechanical elements, the connecting screw being held by a segmented nut comprising a plurality of portions arranged between the connecting screw and an outer envelope, said outer envelope being integral with the second of said separable mechanical elements, said system further comprising an activatable force generator capable of generating a thrust force in a longitudinal direction the force generator, in link with cooperating shapes between each of said portions and the outer envelope, configured to cause a displacement of each of said portions of the segmented nut in a radial direction, perpendicular to the longitudinal direction, from the connecting screw towards the outer envelope to release the connecting screw from the segmented nut in order to separate the two separable mechanical elements, wherein the force generator comprises:
a mechanical energy accumulator capable of generating the thrust force, said accumulator comprising at least one sealed chamber provided with a colloid, said colloid being formed of a porous matrix and of a liquid, the chamber being capable of deforming itself in the longitudinal direction to adapt itself to the change from a compressed state to a decompressed state of the colloid, a state of the colloid depending of a mechanical pressure applied to the chamber, the deformation in the longitudinal direction of the chamber generating the thrust force; and
an activatable actuating element, arranged on the chamber and configured to:
either apply a predetermined mechanical pressure to the chamber in order to keep the colloid in the compressed state,
or, during its activation, not apply the predetermined mechanical pressure to the chamber in order to enable the change from the compressed state to the decompressed state of the colloid.

2. The system according to claim 1, wherein the force generator is configured to bring the colloid into one or the other of the following states:
the compressed state when the chamber is subjected to a mechanical pressure value which is greater than or equal to a first predetermined pressure threshold, the intrusion of at least some of the liquid into the pores of the porous matrix generating the compressed state of the colloid;
the decompressed state when the chamber is subjected to a pressure value which is less than or equal to a second predetermined pressure threshold, the extrusion of at least some of the liquid of the pores of the porous matrix generating the decompressed state of the colloid,
the first predetermined pressure threshold being greater than the second predetermined pressure threshold.

3. The system according to claim 1, wherein the deformable and sealed chamber comprises a bellows made of one of the following materials: metal, elastomer.

4. The system according to claim 1, wherein the deformable and sealed chamber is a chamber of an actuator.

5. The system according to claim 1, wherein the surface of the porous matrix is covered with a lyophobic chemical layer.

6. The system according to claim 1, wherein the holding device further comprises a support element arranged between firstly the force generator and secondly the connecting screw and the plurality of portions of the segmented nut, said support element being configured to receive the thrust force generated by the force generator and transmit it to the connecting screw and to the plurality of portions producing both the displacement of the connecting screw in the longitudinal direction and the displacement in the radial direction of each of said portions.

7. The system according to claim 1, wherein each of said portions of the segmented nut is provided with a radially inner face, whose shape is configured to cooperate with the connecting screw, and provided with a radially outer face, whose shape is configured to cooperate with the outer envelope in order to take part in the transmission of the thrust force then in the release of the connecting screw.

8. The system according to claim 6, wherein the holding device comprises:

the support element of a conical shape, provided with a planar central portion and with an annular portion;

the connecting screw of a circular cross section, arranged on the planar central portion of the support element by a first face and integral with the first separable mechanical element by a second face, said second face being opposite said first face;

the outer envelope of a circular cross section greater than the circular cross section of the connecting screw, the outer envelope being provided with a bent end on which rests an end of the annular portion of the support element; and the segmented nut formed of the plurality of portions arranged between the connecting screw and the outer envelope, which relies on the annular portion of the support element, the segmented nut being capable of moving in the radial direction along the annular portion of the support element from a first bearing position against the connecting screw towards a second position in which the connecting screw is released.

9. A device for the electromechanical separation of at least two separable mechanical elements comprising a plurality of point separation systems as specified in claim 1.

* * * * *